US012656993B2

(12) United States Patent
Oosthoek et al.

(10) Patent No.: US 12,656,993 B2
(45) Date of Patent: Jun. 16, 2026

(54) ELECTRONIC SHELF LABEL SYSTEM WITH SECTIONAL CONTROL OF DISPLAY CONTENT

(71) Applicant: VusionGroup GmbH, Fernitz-Mellach (AT)

(72) Inventors: Jan Oosthoek, Landsmeer (NL); Andreas Rössl, Fernitz-Mellach (AT)

(73) Assignee: VusionGroup GmbH, Fernitz-Mellach (AT)

( * ) Notice: Subject to any disclaimer, the term of this patent is extended or adjusted under 35 U.S.C. 154(b) by 0 days.

(21) Appl. No.: 18/648,612

(22) Filed: Apr. 29, 2024

(65) Prior Publication Data

US 2024/0272859 A1 Aug. 15, 2024

Related U.S. Application Data

(63) Continuation of application No. 16/762,744, filed as application No. PCT/EP2017/078846 on Nov. 10, 2017, now Pat. No. 12,001,747.

(51) Int. Cl.
*G06F 3/14* (2006.01)
*G06F 3/041* (2006.01)
(Continued)

(52) U.S. Cl.
CPC ............ *G06F 3/1446* (2013.01); *G06F 3/041* (2013.01); *G09F 3/204* (2013.01); *G09F 3/208* (2013.01);
(Continued)

(58) Field of Classification Search
CPC .... G06F 3/1446; G06F 1/1601; G06F 1/1637; G06F 3/147; G06F 3/0488; G06F 3/017;
(Continued)

(56) References Cited

U.S. PATENT DOCUMENTS

| 2001/0006375 A1* | 7/2001 | Tomooka | .............. G06F 3/1446 |
| | | | 345/4 |
| 2002/0109593 A1 | 8/2002 | Swartzel et al. | |

(Continued)

FOREIGN PATENT DOCUMENTS

EP 2402929 A1 1/2012

OTHER PUBLICATIONS

The extended European search report issued by the European Patent Office on Sep. 4, 2024, which corresponds to European Patent Application No. 24178185.5-1207 and is related to U.S. Appl. No. 18/648,612.

(Continued)

*Primary Examiner* — Sujit Shah
(74) *Attorney, Agent, or Firm* — Studebaker Brackett PLLC

(57) ABSTRACT

An electronic shelf label system, comprising a number of display devices to display content on its screen or its screens, each device comprises a memory stage to store content data, and a control stage to control the display of the content on its screen; wherein the screen is a video screen and realizes a shelf rail or covers a front of a shelf rail or a part of it to which it is attachable, and the content is a video and the memory stage stores the entire video data of the video, and the control stage is designed to define a display window for the video and to display only the video content within the display window on its screen.

18 Claims, 4 Drawing Sheets

(51) Int. Cl.
  *G09F 3/20* (2006.01)
  *G09F 9/302* (2006.01)
  *G09G 5/12* (2006.01)

(52) U.S. Cl.
  CPC ............. *G09F 9/3026* (2013.01); *G09G 5/12* (2013.01); *G09G 2340/045* (2013.01); *G09G 2354/00* (2013.01); *G09G 2370/16* (2013.01); *G09G 2380/04* (2013.01)

(58) Field of Classification Search
  CPC .......... G06F 3/1423; G06F 3/14; G06F 3/041; G09G 2300/026; G09G 5/12; G09G 2340/045; G09G 2354/00; G09G 2370/16; G09G 2380/04; G09F 3/204; G09F 3/208; G09F 3/3026
  See application file for complete search history.

(56) References Cited

U.S. PATENT DOCUMENTS

| | | | |
|---|---|---|---|
| 2004/0257337 A1 | 12/2004 | Shibamiya et al. | |
| 2010/0111491 A1* | 5/2010 | Kamoto | H04N 5/073 |
| | | | 386/207 |

| | | | |
|---|---|---|---|
| 2012/0119977 A1 | 5/2012 | Asami | |
| 2012/0128315 A1 | 5/2012 | Asami | |
| 2015/0199942 A1 | 7/2015 | Mochizuki | |
| 2015/0256592 A1* | 9/2015 | Young | H04L 65/00 |
| | | | 715/719 |
| 2016/0034988 A1* | 2/2016 | Howard | G06V 40/23 |
| | | | 348/143 |
| 2016/0134930 A1 | 5/2016 | Swafford | |
| 2016/0224306 A1* | 8/2016 | Rycyna, III | G09G 3/32 |
| 2016/0255268 A1* | 9/2016 | Kang | H04N 23/57 |
| | | | 348/333.11 |

OTHER PUBLICATIONS

Communication pursuant to Article 94(3) EPC issued by the European Patent Office on Jan. 16, 2026, which corresponds to European Patent Application No. 24178185.5-1207 and is related to U.S. Appl. No. 18/648,612.

* cited by examiner

ELECTRONIC SHELF LABEL SYSTEM WITH SECTIONAL CONTROL OF DISPLAY CONTENT

CROSS-REFERENCE TO RELATED APPLICATIONS

This application is a Continuation of U.S. patent application Ser. No. 16/762,744 filed May 8, 2020, which is the U.S. National Stage of International Application No. PCT/EP2017/078846 filed Nov. 10, 2017, the entire contents of which are incorporated herein by reference.

TECHNICAL FIELD

The invention relates to an electronic shelf label system with display devices.

BACKGROUND

A known electronic shelf label (ESL) system comprises a large number of ESLs that are mounted on individual positions on shelf rails of shelfs in a retailer's shops. The ESLs are controlled by a server. The server distributes individual content to be displayed on the screen of each ESL. This content represents product or price information of products to which the individual ESL is assigned. The content is typically submitted as static picture which is then rendered by a low power consuming electrophoretic display. Attempts to use conventional ESLs to display dynamic content failed so fare. Because of this such ESLs do rarely trigger the attention of a customer.

The object of the invention is to provide a system that avoids the problems discussed above and that is capable of reaching a high attention of a customer when content is displayed.

SUMMARY OF THE INVENTION

This object is achieved by a system according to claim 1. Therefore, the subject matter of the invention is an electronic shelf label system, comprising a number of display devices to display content on its screen or its screens, each device comprises a memory stage to store content data, and a control stage to control the display of the content on its screen, wherein the screen is a video screen and realizes a shelf rail or covers a front of a shelf rail or a part of it to which it is attachable, and the content is a video and the memory stage stores the entire video data of the video, and the control stage is designed to define a display window for the video and to display only the video content within the display window on its screen.

The measures according to the invention provide the advantage that it is now possible to trigger the utmost attention of a customer at a shelf by showing video content along its shelf rail. In particular, by the aid of the display window feature it is first time ever possible to distribute sections of the entire video picture over a number of shelfs rails, e.g. those who are arranged one above the other. For example, if mountaineering products are presented on three shelfs floors arranged one above the other the spatial distribution of a mountaineering video over the three screens mounted on the shelf floors triggers excitement for mountaineering or the products concerned at a customer in the shop and may lead to improved sales numbers. In fact, on such a shelf the mountaineering products are now presented in the appropriate adventure context.

Further particularly advantageous designs and extensions of the invention arise from the dependent claims and the following description.

The video may be transmitted to the display devices be streaming technology. However, in a large shop the number of display devices may be relatively high, e.g. a few hundreds to a few thousands, and steaming may be difficult because of bandwidth limitation. Hence, according to a further aspect of the invention it is of advantage that the system comprises a first server to distribute the video data of a video to a group of said devices upfront to playback start. This in fact enables the use of inexpensive hardware for the display devices. Advantageously, after download of the video data is completed, the communication channel/medium used for downloading the video data to the device is fully available for the communication of the devices with each other for e.g. checking their synchronized playback progress without any server involvement.

According to a preferred embodiment, the devices are designed to playback compressed video data that are structured in frames labeled by frame numbers. In this embodiment, the devices are designed to utilize a frame number that labels the frame that is currently played back as the progress-data to be transmitted in the group of devices playing the same video. Transmission happens repeatedly, in particular in aperiodic manner. Each device is designed to compare a frame number received with a frame number of the frame currently played back at the device and to determine an asynchronous playback progress if the difference in the frame numbers compared with each other exceeds a predetermined threshold value. The device that detects an asynchronous playback status sends out the higher of the two compared frame numbers, which in turn is used by all devices of the group to continue their playback with this frame number.

According to a further aspect of the invention the display devices are designed to display product and/or product price related information by means of virtual electronic shelf labels displayed within a section of a screen's display area overlapping with a video content or substituting a video content of said section. This feature allows a flexible positioning of the ESL content embedded in the background video that is played back on a screen.

For the sake of clarity, it is mentioned that the communication between the server and the devices as well as the communication between the devices may be realized either by means of wires, e.g. two wire or bus systems, or radio signals.

According to a further aspect of the invention the system may comprises a second server to distribute said product and/or product price information to the display devices concerned.

According to a further embodiment, the two servers mentioned may be provided by a single computer on which a software for both functionalities is executed.

Further to this, a coordinated playback of the video on a number of screens is provided and each screen shows the video content of an individual display window.

In order to achieve this, a number of display devices is grouped together to provide the coordinated playback for all the individual display windows. Grouping may be realized by the aid of the server(s) which are informed about the shelf structure in a shop and the screens attached to the individual shelfs as well as the devices driving said screens.

In a preferred embodiment the coordinated playback comprises a synchronized start of the playback for all display devices in the group. The start may be triggered by the server that uploaded the video or by another device used in the shop.

In an even more preferred embodiment the coordinated playback comprised a synchronized playback for all the display devices in the group.

According to a preferred embodiment, the devices are designed to playback compressed video data that are structured in frames labeled by frame numbers. In this embodiment, the devices are designed to utilize a frame number that labels the frame that is currently played back as the progress-data to be transmitted in the group of devices playing the same video. Transmission happens repeatedly, in particular in aperiodic manner. Each device is designed to compare a frame number received with a frame number of the frame currently played back at the device and to determine an asynchronous playback progress if the difference in the frame numbers compared with each other exceeds a predetermined threshold value. The device that detects an asynchronous playback status sends out the higher of the two compared frame numbers, which in turn is used by all devices of the group to continue their playback with this frame number.

According to a further aspect of the invention a remote-control is provided to define for one or multiple display windows a parameter of said display window for the playback of the video within said display window, preferred including a link between a screen and a display window.

Such a parameter of a display window is at least one of the group of: width, height, ratio of width to height, position along the width of a video picture, position along the height of the video picture.

Further to this the remote control is designed to generate definition data representing the at least one parameter for one or multiple display windows and to submit the definition data to the display device that drives a screen linked to a display window.

According to a further aspect of the invention each device is designed to receive the definition data and to define a display window in accordance with the received definition data.

Such a remote control may be realized by a server, e.g. said video distribution server. However, for a user of the remote-control is often better to define and adjust the display window when located in front of the real shelf and watching the result of the adjustment. Therefore, it is of advantage that said remote-control is realized by the aid of a tabled computer or the like with a touch screen on which a remote-control application is executed that utilizes the touch screen to simulate the video and one or a multiple of the display window positioned on the video picture shown on the touch screen.

In order to enable a live editing experience, it is of advantage that the remote control is in—preferably direct—data connection with the display devices concerned. According to exemplary embodiment this may be achieved by a link established according to the Wi-Fi protocol or standard. Here direct data connection shall mean without any access-point or router involved to control the data routing.

Therefore, according to a further aspect of the invention, it is of advantage that the display device comprises a control interface, preferably a Wi-Fi enabled interface, to receive definition data for defining said display window—preferably directly—from a—preferably portable—remote control that is different from a server that distributed the video data.

Further to this the remote control may be designed to define the size of the display window such that video content is displayed on a screen without distortion of the proportions of the original video content.

The remote control may also be configured such that the width of the original video content is mapped onto the width of the screen or the total width of a number of screens. However, the total width of one window or a number of windows located side by side may be less than the total width of the video picture.

The features of the invention may be realized by means of pure hardware or of programmable hardware on which a software is executed, e.g. microprocessors, microcontrollers or application specific circuits with memory devices to store the software are to be considered.

The devices and their screens are supplied with electric power by means of a centralized power supply or distributed power supplies. Electric power is supplied by means of cables. Battery powered systems are also possible.

Finally, the system uses video screens on or as shelf rails, wherein a display device drives one or more screens, and the display devices are grouped together to generate a background video experience of one single video of which individual geographical sections of the entire video picture are distributed over a number of said screens and product and/or price information is displayed embedded into the individual geographical sections of the video picture.

These and other aspects of the invention are obtained from the figures discussed below.

BRIEF DESCRIPTION OF THE FIGURES

The invention is explained again hereafter with reference to the attached figures and on the basis of exemplary embodiments, which nevertheless do not limit the scope of the invention. In the different figures the same components are labelled with identical reference numbers. They show in schematic fashion in.

DESCRIPTION OF THE EXEMPLARY EMBODIMENTS

Figures 1, 2:
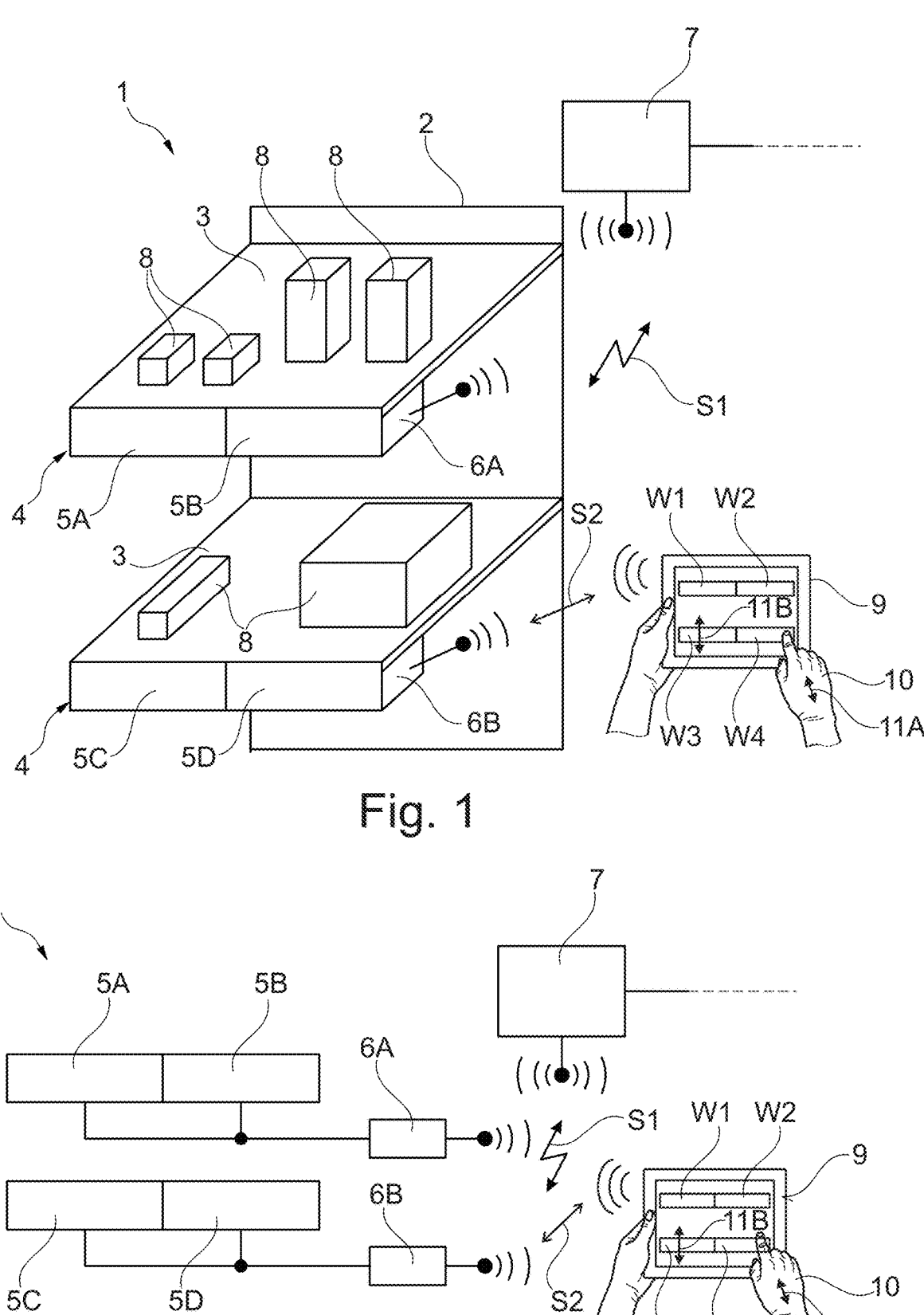
FIG. 1 a system according to the invention installed in a retail store.
FIG. 2 a block diagram of components of the system.

FIG. 1 shows an electronic shelf label system 1 according to the invention. The system 1 is installed in a retail shop of which only a shelf 2 is shown. The shelf 2 has two shelf floors 3 on which goods 8 are placed. At its front, each shelf floor 3 comprises a shelf rail 4 (not shown in detail) to which two video screens 5 are attached along its entire length. Further to this two identical playback devices 6A and 6B are shown. The first device 6A is connected to two video screens 5A and 5B on the upper shelf floor 3 and the second device 6B is connected to two video screens 5C and 5D on the lower shelf floor 3.

The entire video content (the entire film) to be displayed on the screens 5A-5D is supplied by a server 7 via a radio signal S1 to both devices 6A and 6B upfront to playback start. The video content is delivered in form of compressed video data that are structured in frames labeled by frame numbers.

In order to define the individual sections of the video picture that shall be shown by the individual screens 5A-6D the system further comprises a remote control 9. The remote control 9 is realized by the aid of a tabled computer with a touch screen. On the tablet computer, a remote-control application is executed that utilizes the touch screen to display the video available at the devices 6A, 6B. It also displays four windows W1-W4 within the video picture display. Here the first window W1 is linked to the first screen 5A, the second window W2 is linked to second screen 5B, the third window W3 is linked to the third screen 5C and the fourth window W4 is linked to the fourth screen 5D. Each window W1-W4 represents the video zoom section that is intended to be shown by the respective screen 5A-5D linked with it. Due to the fact that the screens 5A and 5B as well as the screens 5C and 5D cover neighboring shelf rails 4 preferably without any significant physical gap in-between, also the windows W1 and W2 as well as the windows W3 and W4 are shown without any gap in-between. In the remote-control application such neighboring windows W1, W2 and W3, W4 are logically linked with each other. This means that if one of the windows is moved by the user on the user interface of the remote-control 9 the other window linked to it also exercises movement.

Further to this the remote-control application uses a Wi-Fi-interface to connect to and to communicate with the devices 6A and 6B, which have a compatible interface. In a large retail shop a large number of devices may be available on various shelfs. In order to connect to the appropriate group of devices (here 6A and 6B because they are installed on the particular shelf for which the video playback windows shall be adjusted or set) the remote-control application my use a data base that shows the available groups of devices, their physical location the shop and the video films linked to the individual groups of devices such that a user can easily select the group of devices to be controlled by the remote-control application.

In operation, the remote-control application uses the touch screen interface of the tablet to detect the interaction with a finger of a user's hand 10 that touches the area showing the fourth window W4. Then the user's hand 10 may move upwards or downwards to change the position of the two windows W3 and W4 towards a desired position within the video picture display. The movement of the finger of the user's hand 10 is translated into a corresponding movement of the windows W3 and W4, which is indicated by the arrows 11A and 11B. This selection of the window W4 (together with its linked window W3) and the movement on the touch screen is reported to the remote-control application that derives generated definition data therefrom, which define the geographical location of the two windows W3 and W4 within the boundaries of the video picture. Thereafter the remote-control application submits the definition data via the Wi-Fi connection S2 to the device 6B, where the definition data are processed.

Figure 5:
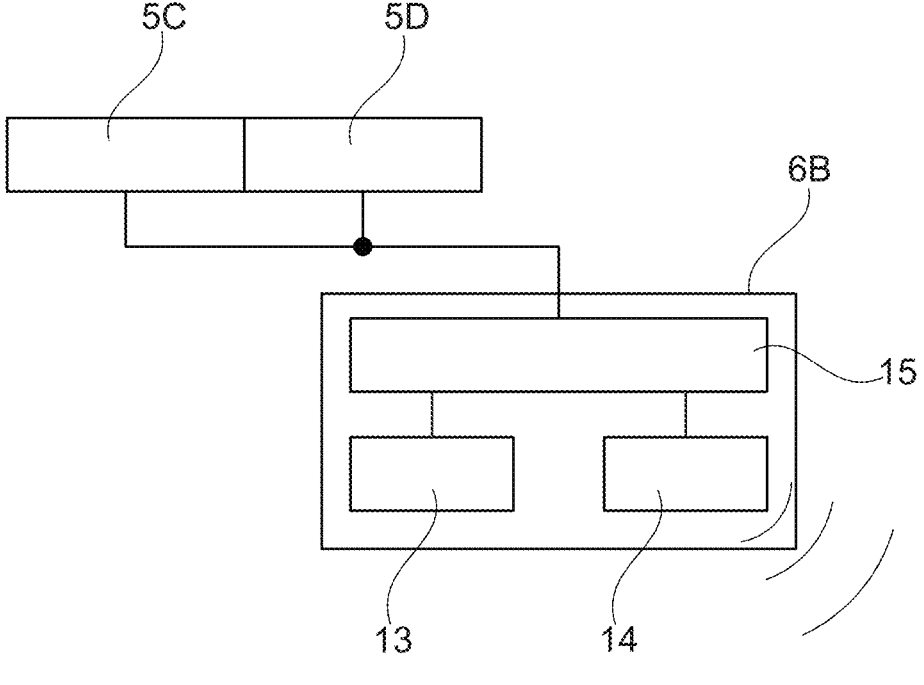
FIG. 5 a block diagram of a display device.

The device 6B is shown in more details in FIG. 5. It comprises a memory stage 13 that sores said video data of the entire film to be displayed according to the window settings for its screens 5C and 5D. It also comprises a Wi-Fi-interface 14 to communicate with the remote control 9. Further to this its components 13 and 14 and the two screens 5C and 5D are connected to a control stage 15 that controls the display of the video content on the screens 5C, 5D.

In particular the control stage 15 receives the definition data from the remote control 9 and defines the display windows for its screens 5C and 5D accordingly, such that only that (geographical) section of the video picture is displayed on its screens that was set by the user interaction on the remote control 9.

For the sake of completeness, it is mentioned that the same structural and/or functional concept applies also to the first device 5A.

In the following the functioning of the devices 6A and 6B and their control by the remote control 9 is explained by the aid of the sequence of FIGS. 3A—3C. In this example, the remote control 9 is in Wi-Fi-connection with the deices 6A and 6B plays back the video shown also in the screens 5A-5D in order to allows real-time (live) editing of window positions.

Figure 3A:
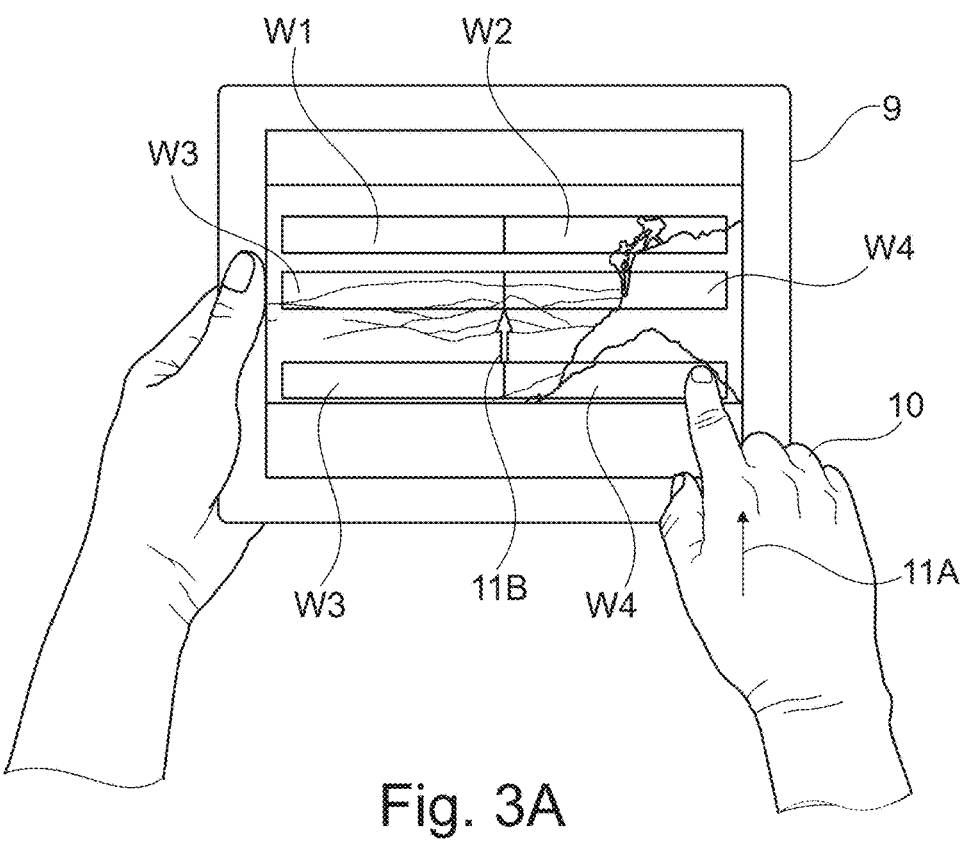
FIG. 3A a user interaction with a remote control of to the system.

The display of the remote-control 9 is visualized in FIG. 3A. It shows a snap shot of a video that relates to mountaineering and that shows on its left side a view into the distant landscape while on its right side two climbers reaching the top of a mountain are displayed.

Here it shall be assumed that windows W1 and W2 that define the geographical boundaries of the video content that is displayed by the screens 5A and 5B are appropriately positions. Within window W1 the blue sky is shown. Within window W2 the climbers reaching the top of the maintain are shown.

In this example, it may be further assumed that the windows W3 and W4 are located at the bottom of the video picture where mainly landscape and rocks are visible.

Figure 3B:
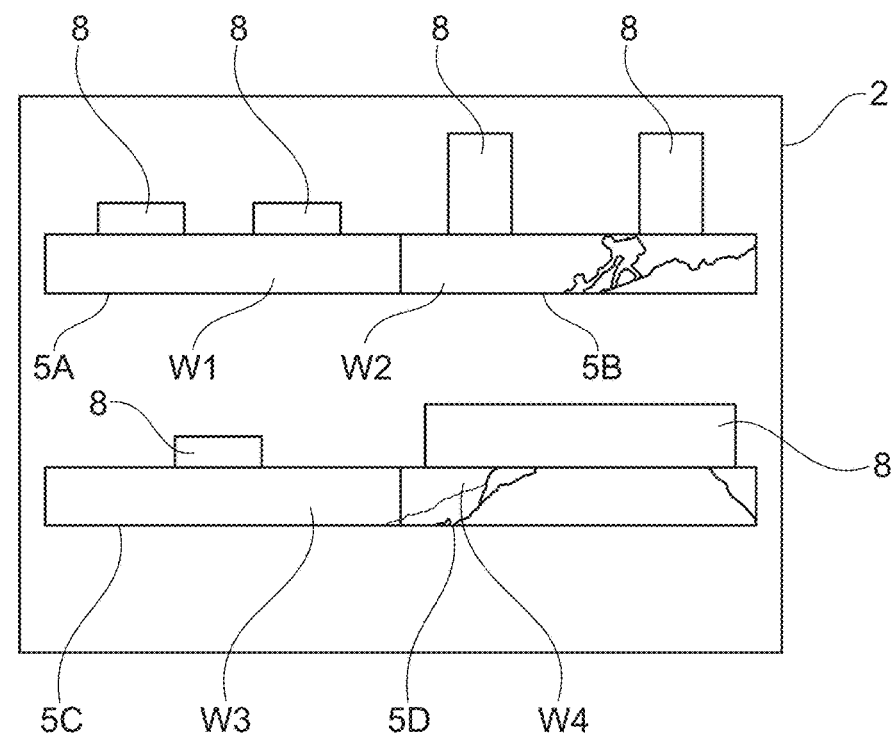
FIG. 3B a video content displayed on screens before said user interaction.

The entire situation is visualized by the FIG. 3B that shows the content of the video (for the particular snapshot) displayed by the four screens 5A—5D on the shelf.

The user that operates the remote-control 9 intends to move the two windows W3 and W4 further upwards into the center of the climbing experience. Therefore, the user touches the fourth window W4 with a finger of its right hand 10 and moves it upwards along the arrow 11A that translates into a movement of the windows W3 and W4 according to the arrow 11B on the display of the remote control 9 toward the climbers. The remote-control application generates the new definition data (representing the new geographic location of the two windows W3 and W4 within the video picture) and submits it to the second device 6B, where the definition data are processed. The zoom on the individual geographical sections of the video picture may be realized e.g. by the aid of a well-known video-feature called "viewbox".

Figure 3C:
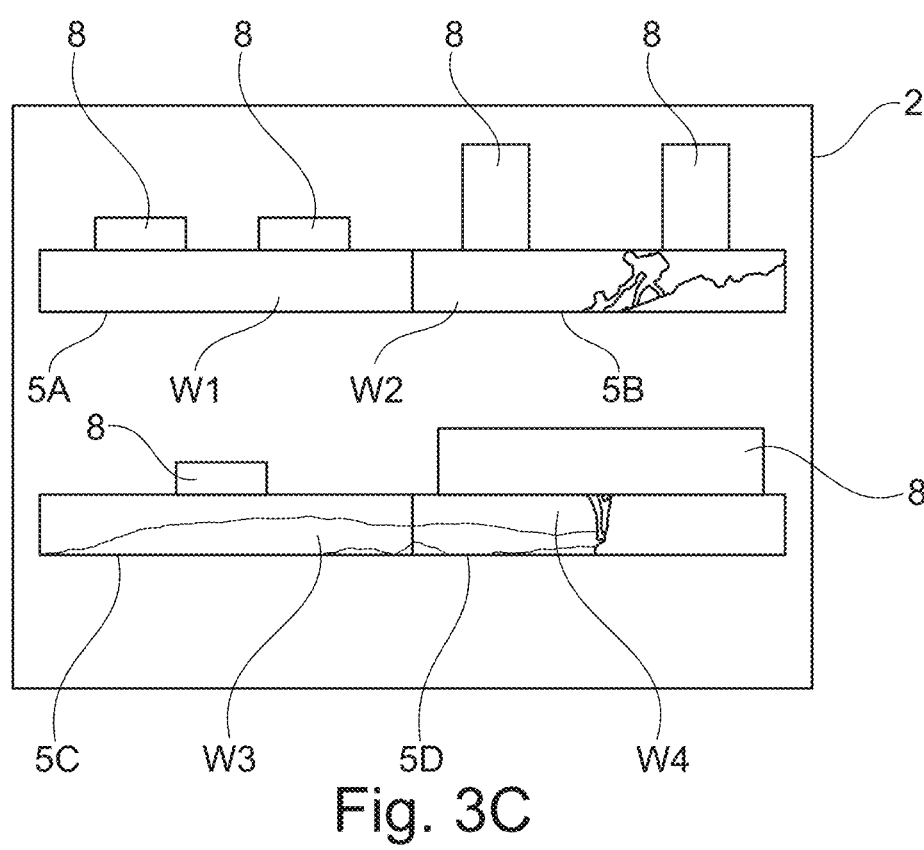
FIG. 3C a video content displayed on the screens after said user interaction.

The result of this processing is visualized in FIG. 3C. Now the screens 5C and 5D display geographical regions of the video that are closer to that regions displayed by the screens 5A and 5B. In fact, the video sequence with the climbers reaching the top of the mountain is now perceived as if the climbers would climb from the bottom shelf floor 3 up on the upper shelf floor 3. In-between the two shelf floors 3 and on top of the upper shelf floor 3 mountaineering products are displayed now in the context of an exciting video experience.

Figure 4:
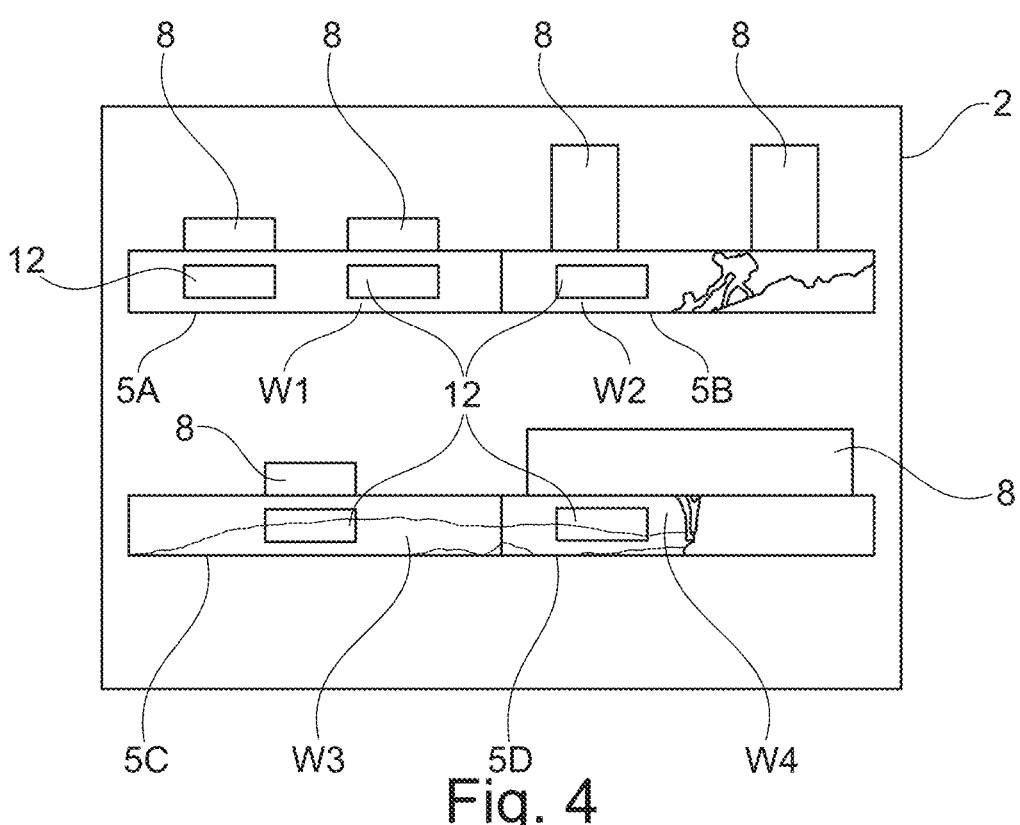
FIG. 4 virtual electronic shelf labels embedded into a video content.

Further to this, as shown in FIG. 4, the devices 6A and 6B may embed virtual electronic shelf labels 12 in the video at positions that correspond to the products they concern. The content for the virtual shelfs labels 12 (and also their initial position) is submitted by the server 7.

According to a further aspect of the invention, the remote control 9 may be used to display the virtual electronic shelf labels 12 on its display and may allow the adjustment of the positioning along the video screens 5A-5D, so to say within the respective window w1-W4. Adjustment data derived therefrom can be submitted to the device 6A or 6B concerned and the device 6A, 6B can process and adjust the position of the respective virtual electronic label 12 accordingly.

Further to this but not shown in the Figures, also the entire electronic shelf label content or even other individual areas of the screens 5A-5C may be used to display an advertisement video that was initially distributed to the individual devices 6A, 6B and then played back distributed over the shelf rail screens 5A-5C. Similar to the (background) video the entire advertisement experience may be assembled from the distributed display of individual advertisement elements of the advertisement video played back in synchronous mode on the different screens 5A-5C. In this mode in fact two different videos-on the one hand the (background) video and on the other hand said advertisement video—are played back simultaneously by the display devices 6A and 6B. Synchronization of the individual videos is achieved in the same manner as for the background video as explained in the chapter summary of the invention. This concept may also be applied to a higher number of videos being played back by the grouped devices.

The measures according to the invention may also be applied in a configuration where the video (and optionally together with other advertisement videos as mentioned above) is e.g. played back in synchronized mode on display devices 6A, 6B, . . . , distributed over two or more shelfs 2, e.g. located side by side or stacked over each other.

Hence, for all the various video experiences that are achievable by distributed video playback over a number of shelfs rails 4 the measures according to the invention can be advantageously applied.

Finally, let it be noted once again that the figures described in detail above only involve exemplary embodiments, which the expert can modify in a wide variety of ways without departing from the area of the invention. For the sake of completeness, let it also be stated that use of the indeterminate article "a" or "an" does not mean that the respective features cannot be present multiple times.

The invention claimed is:

1. An electronic shelf label system, comprising a remote control and one or more display devices configured to display content on a plurality of screens, each display device comprising:
   a memory configured to store a video, and
   a controller configured to control the display of the video on the screens, wherein
   each screen is a video screen and each screen realizes a shelf rail or covers a front of a shelf rail or covers a part of a shelf rail to which the screen is attachable, and
   the remote control is configured to simultaneously define a plurality of display windows within the video, each display window comprising a different portion of the video and corresponding with one of the screens,
   the controller of each display device is further configured to display, on each of the screens of the display device, the portion of the video within the display window that corresponds with the screen,
   the remote control is configured to move the plurality of display windows to cover different areas of the video, the screens comprise a first row of screens and a second row of screens positioned below the first row of screens,
   the remote control is configured to define a first row of display windows and a second row of display windows positioned below the first row of display windows,
   the first row of screens is configured to display the first row of display windows, the second row of screens is configured to display the second row of display windows,
   all of the display windows within the first row of display windows are linked to each other such that moving one of the display windows within the first row of display windows causes all of the display windows within the first row of display windows to move,
   all of the display windows within the second row of display windows are linked to each other such that moving one of the display windows within the second row of display windows causes all of the display windows within the second row of display windows to move, and
   the remote control is configured to move the first row of display windows and the second row of display windows relative to each other to cover different areas of the video.

2. The system according to claim 1, further comprising a first server configured to distribute video data of the video to a group of the display devices upfront to playback start.

3. The system according to claim 1, wherein the display devices are configured to display product and/or product price related information on virtual electronic shelf labels displayed within a section of a display area of the screen overlapping with the video or substituting the video of the section.

4. The system according to claim 3, further comprising a second server configured to distribute the product and/or product price information to the display devices.

5. The system according to claim 1, wherein a coordinated playback of the video on a plurality of the screens is provided and each screen shows the video of an individual display window among the plurality of display windows.

6. The system according to claim 5, wherein a plurality of the display devices is grouped together to provide the coordinated playback for all the display windows.

7. The system according to claim 5, wherein the coordinated playback comprises a synchronized start of the playback on each of the plurality of the screens.

8. The system according to claim 5, wherein the coordinated playback comprises a synchronized playback on each of the plurality of the screens.

9. The system according to claim 1, wherein the remote control is configured to define, for each of the display windows, at least one parameter of the display window for the playback of the video within the display window.

10. The system according to claim 9, further comprising, for each of the screens and each of the display windows, a link between the screen and the display window.

11. The system according to claim 10, wherein the at least one parameter comprises a width, a height, a ratio of width to height, a position along the width of a video picture, and/or a position along the height of the video.

12. The system according to claim 11, wherein the remote control is configured to generate definition data representing the at least one parameter for one or more of the plurality of display windows and to submit the definition data to one or more of the display devices that drive the screen linked to the one or more of the display windows.

13. The system according to claim 12, wherein each display device is configured to receive the definition data and to define the display window of one of the screens based on the received definition data.

14. The system according to claim 9, wherein the remote control comprises a tablet computer with a touch screen on which a remote-control application is executed that utilizes the touch screen to simulate the video and one or more of the display windows positioned on the video.

15. The system according to claim 9, wherein the remote control and the display device are linked at least by a Wi-Fi connection for real-time editing of the display windows.

16. The system according to claim 1, wherein the display device comprises a control interface configured to receive definition data for defining the display windows from the remote control, the remote control being different from a server that distributed video data of the video.

17. The system according to claim 16, wherein the control interface is a Wi-Fi enabled interface.

18. The system according to claim 16, wherein the remote control is portable.

\* \* \* \* \*